Aug. 3, 1948.   F. V. FLYNT   2,446,174
INSERT
Filed May 21, 1946

INVENTOR.
Frank V. Flynt
BY Mason + Graham
Attys.

Patented Aug. 3, 1948

2,446,174

UNITED STATES PATENT OFFICE 2,446,174

INSERT

Frank V. Flynt, Los Angeles, Calif.

Application May 21, 1946, Serial No. 671,364

9 Claims. (Cl. 85—1)

1

This invention relates to inserts positioned from one surface of a workpiece and designed to enable metal parts, such as fastening or locating means, to be held in the workpiece so that the parts are securely retained therein against any slacking back, and enabling fastening or locating parts to be secured in relatively soft material, such as plastic or aluminum.

Plastic material and aluminum, for example, are too soft to hold satisfactorily ordinary types of harder metal fastening means directly positioned therein. Various methods of mounting fastening means by use of inserts in softer material have been proposed, which necessitated working from both sides of a workpiece or the application of considerable force applied directly axially of the insert to force a locking element into the workpiece. The force required to position the locking element in such constructions may be harmful in positioning inserts in relatively fragile parts.

A general object of the present invention is to provide insert means which may be inserted from one side of a workpiece in which no material externally applied axial force is required to properly position the insert in softer material.

Another object of the invention is to provide a simply constructed insert by the use of which fastening means may be securely held in material softer than the fastening means.

Another object of the invention is to provide insert means for mounting in softer material by a screwing movement of a retaining member to effect a longitudinal movement of the insert into the softer material and a locking effect of the retaining element.

Another object is to provide an insert which may be readily produced in a variety of forms adapted for use with materials of different hardness.

Another object is to provide a greater load carrying capacity in a blind insert than is provided by known inserts of equal depth.

Still further objects and features of the invention will appear from the following description taken in conjunction with the accompanying drawings, in which.

2

Figure 6:
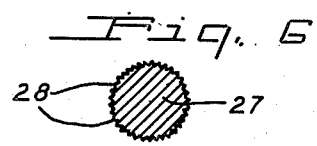
Fig. 6 is a section on line 6—6 of Fig. 5.
Figure 7:
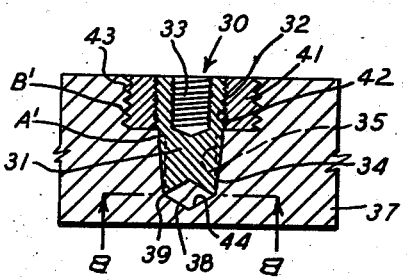
Figure 8:
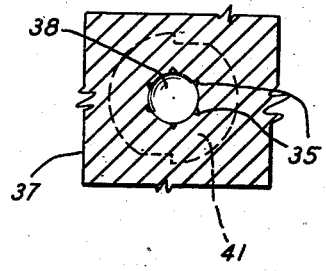

Fig. 7 is a vertical section through another form of insert adapted for use with relatively hard material and shown mounted therein; and Fig. 8 is a section on the line 8—8 of Fig. 6.

Referring now to the drawings, reference numeral 10 generally indicates a stud or screw which is provided with a threaded stem 14 and with a head 12, the head being considered to be at the inner end of the screw. The thread on the stem may be a standard one. The head is provided with what may be termed splines 13 which, in the form shown, preferably taper or converge toward the inner end of the screw. The splines have a sharp edge to facilitate their entry into the workpiece, as will later be described.

The screw 10 is adapted to accommodate a driving ring 16 which is internally threaded to fit on the stem of the screw and which is provided at its periphery with a second thread 18. The second thread has a faster lead or a greater or steeper pitch than the thread on the stem of the screw for a reason which will be brought out later. The thread 18 on the exterior of the ring 16 is designed to be self-cutting and for this purpose is interrupted by the longitudinal channels 22 which form cutting edges for the interrupted parts of the thread. The upper end of the ring 16 is provided with a suitable means for enabling a tool to engage it to exert a torque on the ring and in the form shown the ring is provided with a pair of aligned slots 20 which may be engaged by a suitably formed wrench.

As previously described, the splines 13 are tapered toward the end of the screw; that is, they converge, thereby providing a head on the screw which is of less cross section at its inner end than at any other point. Preferably the diameter across the top of the splines is somewhat greater than the hole into which the insert is to be driven, while the diameter across the lower or inner end of the splines is slightly less than that of the hole. This construction enables the insert to be readily positioned in a hole formed in the workpiece into which the insert is to be driven, a few light taps with a hammer on the upper end of the stem being sufficient to engage the splines with the wall of the hole and prevent it turning during its axial movement into the hole, as will now be described.

Figure 1:
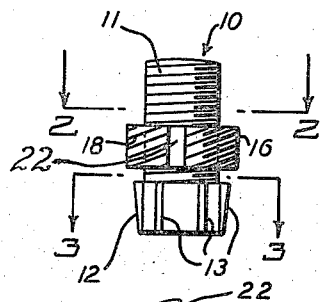
Fig. 1 is an elevation of one form of insert.
Figure 2:
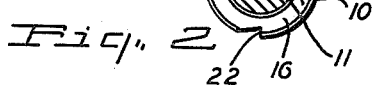
Fig. 2 is a section on the line 2—2 of Fig. 1.
Figure 3:
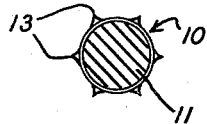
Fig. 3 is a section on the line 3—3 of Fig. 1.
Figure 4:
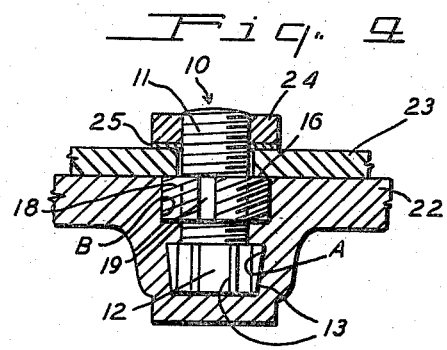
Fig. 4 is a section showing the insert in position in a molded plastic piece.

Reference is made to Fig. 4, in which there is shown a workpiece 22 having a bore indicated by reference character A and a counterbore indicated by the character B. In this view a metal plate or other object to be fastened to the relatively soft workpiece 22 has been indicated at 23.

In this view the insert is shown fully positioned in the workpiece 22 and the plate 23 secured thereto by means of a fastening element in the form of a nut 24, a washer 25 being interposed between the nut and the plate if desired.

In the operation of securing the insert means in the workpiece, the head at the inner end of the screw 10 is positioned within the bore A and locked therein against rotation by a slight tap or small amount of force applied to the end of the screw. The driving ring 16 is then screwed down on the stem of the screw until the external thread thereof engages with the wall of the counterbore B. Further rotation of the driving ring serves to cause it to thread itself into the material of the workpiece, while at the same time, by reason of the difference in the pitch of the threads of the ring, forcing the head of the screw downwardly into the bore A of the workpiece. It is to be understood, of course, that the bore A and counterbore B are previously formed in the workpiece and that the diameters of these bores are such as to leave sufficient material for the splines on the head of the screw to become embedded therein and the outer thread of the driving ring to screw into. Obviously the counterbore may be provided with a screw thread to receive the driving ring, but this is unnecessary in most materials.

After the insert means has been mounted in the workpiece, as shown in Fig. 4, the member to be secured to the workpiece may be fastened thereto by means of a nut 24 heretofore described.

Figure 5:
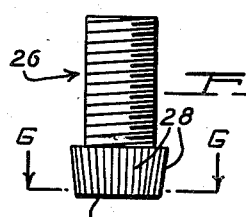
Fig. 5 is an elevational view of another form of insert.

In Figs. 5 and 6 there is shown a form of screw which is designed to be used in material softer than that for which the insert previously described is designed, particularly plastic material. In this form of the invention the screw, indicated generally by 26, is provided with a relatively short serrated head 27, the ridged portions 28 thereof extending longitudinally of the head and tapering toward the inner end of the screw so that in effect a tapered serrated head is provided. This screw is mounted in the workpiece in the same manner that the insert previously described is mounted, but by reason of the large number of ridged portions of limited radial extent provided, is more adaptable for use in relatively softer materials than that form of the invention previously described.

Referring now to Figs. 7 and 8, there is illustrated a form of insert embodying the invention which is designed primarily for use with relatively harder materials. This insert comprises what will be termed a screw, generally indicated at 30, which has a stem 31 externally threaded at 32 and provided with a threaded bore 33 in the upper end thereof. The inner end or lower end of the screw has a head 34 from which extend a limited number of external ridges or splines 35 which taper toward the end of the head. In this form of the invention the head is more elongated than in the forms previously described.

In order to facilitate the entry of the screw 30 into the material of the workpiece, indicated at 37, the lower end of the head is recessed at 38 to provide a cutting edge 39. In this form of the invention the screw 30 is driven into the bore indicated at A' by the threading of the driving ring 41 into the counterbore B', the driving ring being internally threaded at 42 to screw onto the stem of the screw and being externally threaded at 43 with a self-cutting thread of steeper pitch than the internal thread to thread into the workpiece and simultaneously drive the screw into the workpiece. As the screw is driven into the workpiece, the cutting edge 39 on the inner end of the head facilitates entry of the head and any cuttings or scrapings cut from the wall of the bore will be accommodated in the normal recessed portion 44 at the bottom of the bore A' and by the recess 38 in the head of the screw.

With this form of the invention a fastening element may be screwed into the threaded hole 33 in the screw for the purpose of securing an element to the workpiece.

It has been found that the construction described affords a secure retention of the insert in the material of the workpiece without requiring any material axial force to be applied to the insert means externally of the workpiece in order to properly position the insert means in the workpiece.

I claim:

1. An insert device for providing mounting for a relatively hard object in a bore of softer material, comprising an externally threaded stem having a peripherally splined head on its inner end, said stem being insertable from one side of the workpiece axially head first into the bore with the splines engaging the side wall of the bore, a driving ring insertable into said bore around the stem, said ring having an internal thread engageable with the thread on the stem and an external thread of relatively steep pitch engageable with the side wall of the base and being formed to be engageable by a torque applying tool, and means associated with the outer end of the stem for receiving said object.

2. An insert device as set forth in claim 1 in which the splines are tapered inwardly toward the end of the head to facilitate engagement of the splines in the wall of the bore when starting the head thereinto.

3. An insert device as set forth in claim 1 and in addition comprising a cutting edge extending around the head of the stem, said cutting edge being provided by a recess formed in the head.

4. An insert device as set forth in claim 1 in which the external thread on said driving ring is interrupted to provide a self-cutting thread.

5. An insert device for use as described, comprising an inner member having an externally threaded stem and having a splined head, the splined portion of said head being tapered toward the end of the head, and a driving ring having an internal thread adapted to screw onto the stem of said inner member and having an external cutting thread formed about its periphery of steeper pitch than said internal thread.

6. An insert device for use as described comprising an inner member having an externally threaded stem and having a splined head, the splined portion of said head being tapered toward the end of the head, a driving ring having an internal thread adapted to screw onto the stem of said inner member and having an external cutting thread formed about its periphery of steeper pitch than said internal thread, and means on said inner member for securing a fastening element thereto.

7. An insert device for use as described comprising an inner member having an externally threaded stem and having a splined head, the splined portion of said head being tapered toward the end of the head, and a driving ring having an internal thread adapted to screw onto the stem of said inner member and having an external cutting thread formed about its periphery of steeper pitch than said internal thread, said stem being provided with a recess and with means therein engageable by a fastening member for securing the fastening member to said inner member.

8. An insert device for use as described comprising an inner member having an externally threaded stem and having a splined head, the splined portion of said head being tapered toward the end of the head, said head having a recess therein at the end providing a cutting edge, and a driving ring having an internal thread adapted to screw onto the stem of said inner member and having an external cutting thread formed about its periphery of steeper pitch than said internal thread.

9. An insert device for use as described comprising an inner member having an externally threaded stem and having a serrated head, the serrations thereof extending longitudinally of the head and tapering toward the end of the head, and a driving ring having an internal thread adapted to screw onto the stem of said inner member and having an external cutting thread formed about its periphery of steeper pitch than said internal thread.

FRANK V. FLYNT.